US007296350B2

(12) United States Patent
Sexton et al.

(10) Patent No.: US 7,296,350 B2
(45) Date of Patent: Nov. 20, 2007

(54) METHOD FOR FABRICATING A DROP GENERATOR

(75) Inventors: Richard W. Sexton, Bainbridge, OH (US); James E. Harrison, Jr., Dayton, OH (US)

(73) Assignee: Eastman Kodak Company, Rochester, NY (US)

( * ) Notice: Subject to any disclaimer, the term of this patent is extended or adjusted under 35 U.S.C. 154(b) by 382 days.

(21) Appl. No.: 11/079,783

(22) Filed: Mar. 14, 2005

(65) Prior Publication Data

US 2006/0203038 A1 Sep. 14, 2006

(51) Int. Cl.
*B21D 53/76* (2006.01)
*G01D 15/00* (2006.01)
*B41J 2/14* (2006.01)

(52) U.S. Cl. ...................... 29/890.1; 29/25.35; 29/832; 29/841; 29/855; 216/27; 347/47

(58) Field of Classification Search ............... 29/25.35, 29/890.1, 832, 831, 841, 855, 850; 347/49, 347/41, 47, 86; 216/27, 13, 18; 205/68, 205/60, 69
See application file for complete search history.

(56) References Cited

U.S. PATENT DOCUMENTS

| | | | | |
|---|---|---|---|---|
| 4,558,333 | A * | 12/1985 | Sugitani et al. | 347/65 |
| 4,999,647 | A | 3/1991 | Wood et al. | |
| 5,458,254 | A * | 10/1995 | Miyagawa et al. | 216/27 |
| 5,686,949 | A * | 11/1997 | Swanson et al. | 347/87 |
| 5,739,831 | A * | 4/1998 | Nakamura et al. | 347/51 |
| 6,371,596 | B1 * | 4/2002 | Maze et al. | 347/47 |

* cited by examiner

*Primary Examiner*—Peter Vo
*Assistant Examiner*—Tai Van Nguyen

(57) ABSTRACT

A method for fabricating a drop generator with a uniquely formed nonconductive mandrel, which when encapsulated with electroplated metal, shapes and defines the internal ink channel entails identifying a non-conductive dimensionally stable structure with a shape adapted to define a fluid cavity for the drop generator for an ink jet printer. The ends of the structure are covered with caps. A conductive base is mounted to each structure. Metal from the conductive base is electroformed onto the structure to a thickness at least equivalent to a desired outer dimension. The caps are removed and the structure is removed, thereby leaving a drop generator with a channel adapted to receive fluid and a slot adapted to communicate fluid from the channel to the orifice plate.

14 Claims, 9 Drawing Sheets

METHOD FOR FABRICATING A DROP GENERATOR

FIELD OF THE INVENTION

The present embodiments relate generally to electroforming of complex shaped ink jet print heads.

BACKGROUND OF THE INVENTION

Electroforming is a technique used to make intricate precision structures that are difficult to fabricate by other processes, such as machining. Useful devices, such as wave guides and printing screens, have been made by electroplating onto a preformed shape and subsequently selectively removing the shaped structure or mandrel to leave a free standing part made from the electroplated metal. When good corrosion properties are required, nickel works very well as the electroplated metal.

Drop generators for full page width print heads of 8.5 inches or more are difficult to fabricate by ordinary machining methods. As shown in Wood U.S. Pat. No. 4,999,647, the preferred drop generator shape is long and narrow. The channel for ink delivery has a specific and well defined geometry, as shown in FIG. 2 in Wood U.S. Pat. No. 4,999,647. The cylindrical channel and connecting slot are typically made by gun drilling, electric discharge machining, and grinding. Even with great care, skilled machinists find it difficult and time consuming to make these parts to the exacting tolerance required.

Other solutions simplifying fabrication of internal passages include symmetrically dividing the drop generator into two machined halves and then brazing these two together to make the whole part. This solution cannot be done with long narrow drop generators due to warping that occurs from exposure to high brazing temperatures.

A need exists for a method to fabricate reproducibly the internal cavities of the drop generator smoothly and without irregularities that normally occur in machining.

The present embodiments meet this need.

SUMMARY OF THE INVENTION

Embodied herein is a method for fabricating a drop generator. The method entails identifying a non-conductive dimensionally stable structure with a shape adapted to define a fluid cavity for the drop generator for an ink jet printer. The structure includes at least one portion to be formed into a channel for a drop generator and at least one portion to be formed into a slot for transferring fluid from the channel to an orifice plate. Caps are added to each end of the structure and a conductive base is mounted to each non-conductive dimensionally stable structure surrounding the portion to be formed into a slot.

The method continues by electroforming metal from the conductive base to encapsulate the non-conductive dimensionally stable structure between the caps to a thickness at least equivalent to a desired outer dimension. The caps and the non-conductive dimensionally stable structure are removed from the encapsulated structure, thereby forming a drop generator with a channel adapted to receive fluid and a slot adapted to communicate fluid from the channel to the orifice plate.

The present embodiments are advantageous over known techniques because the methods are easy to implement, multiple parts can be formed in one session, and the straight channels are smooth without defects to block channels and slots that feed ink to the nozzles of the ink jet.

BRIEF DESCRIPTION OF THE DRAWINGS

In the detailed description of the preferred embodiments of the invention presented below, reference is made to the accompanying drawings, in which.

Figure 1:
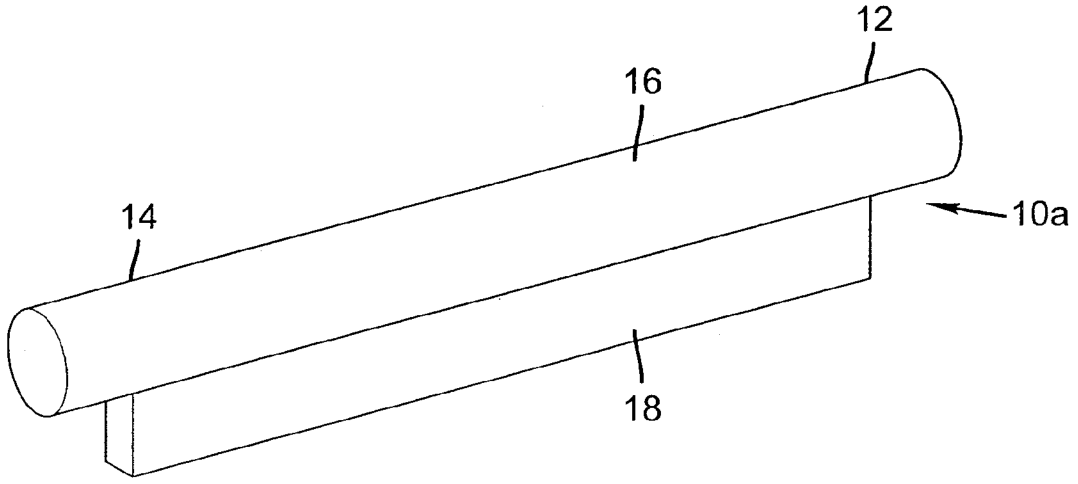
FIG. 1 depicts an embodiment of a non-conductive dimensionally stable structure.

The present embodiments are detailed below with reference to the listed Figures.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

The present embodiments relate to methods for making drop ejection devices (i.e., drop generators) having long, smooth, and straight internal bores. The methods and resulting apparatus are useful for metallic inkjet printer manifolds. The methods can be useful for other devices that require precision internal geometries, such as waveguides, as well.

Typically, inkjet printer manifolds are difficult and expensive to machine. Internal passages of machined manifolds are difficult to clean due to retained machining chips and recast layer.

The methods herein provide a method to electroform channels in substrates to form drop generators which are less expensive and more versatile than those conventionally available.

Channels that are made by electroforming are inherently free of machining debris. For example, a typical manifold costs hundreds of dollars to machine from a solid block of metal, whereas the cost to fabricate an electroformed structure with internal channels using the embodied methods costs up to twenty percent less, because numerous machining operations are eliminated.

The embodied methods provide more reliable printheads at lower costs.

The methods herein are used to create a uniquely formed non-conductive structure or mandrel, which when encapsulated with electroplated metal, shapes and defines the internal ink channel of a drop generator. Subsequent removal of the mandrel and the dimensionally stable structure provides a smooth and straight internal passage.

An embodiment of a method for fabricating a drop generator entails identifying a non-conductive dimensionally stable structure with a shape adapted to define a fluid cavity for the drop generator for an ink jet printer. The structure includes at least two portions. The first portion of the structure is formed into a channel for a drop generator. The second portion of the structure is formed into a slot for transferring fluid from the channel to an orifice plate. The ends of the structure are covered with caps.

A conductive base is mounted to the non-conductive dimensionally stable structure to surround at least part of the portion of the structure used as a mandrel for forming a slot to transfer fluid from the channel to an orifice plate. The conductive base can alternatively contain a cavity to receive the structure. The conductive base is preferably mounted so at least a section of the slot in the structure is disposed between a first part of the base and a second part of the base.

The method continues by electroforming metal outward from the conductive base to encapsulate the non-conductive dimensionally stable structure between the first and second caps to form an encapsulated structure. The metal is electroformed onto the structure to a thickness that is at least equivalent to a desired outer dimension. The thickness of the metal from the conductive base to encapsulate the non-conductive dimensionally stable structure is preferably at depth that can sustain machining of the encapsulated structure in order to form the exterior of the drop generator. Examples of metals used in the electroforming step include copper, nickel, gold and other metals. Nickel is the preferred electroform material for forming the drop generator.

The caps on the ends of the structure are composed of a non-conductive material adapted to shield the first and second ends from electroforming metal.

The method continues by removing the first cap and second cap from the encapsulated structure and removing the non-conductive dimensionally stable structure to form a drop generator. The formed drop generator includes a channel adapted to receive fluid and a slot adapted to communicate fluid from the channel to the orifice plate. The step of removing the nonconductive structure is typically performed by etching, vaporizing, melting, dissolving, or combination thereof.

The method can include the step of machining the encapsulated structure in order to form the exterior of the drop generator.

With reference to the figures, FIG. 1 depicts a non conductive dimensionally stable structure with a first end 12 and a second end 14. The structure has a first portion 16 that will become a channel and a second portion 18 that will become a slot. The non conductive dimensionally stable structure can be a composite, a crystalline polymer, a ceramic, a glass, and combinations thereof. Alternatively, the non-conductive dimensionally stable structure can be a metal tube wrapped with an adhesive-coated polyimide material.

FIG. 1 depicts the embodiment wherein the non-conductive dimensionally stable structure 10*a* has a round shape. Other usable shapes for the structure include a square, a triangular, an ellipsoid, and other geometric shapes. Typically, the drop generator is a six-sided structure, so the embodied methods can be used to create a variety of shapes and geometric forms. The drop generator created by the embodied methods can be a drop-on-demand generator, as well as a continuous feed inkjet.

In order to form the drop generator desired, a positive replica of the channel and slot is created from a material that can later be removed by selectively etching from the electroformed material.

Figure 2:
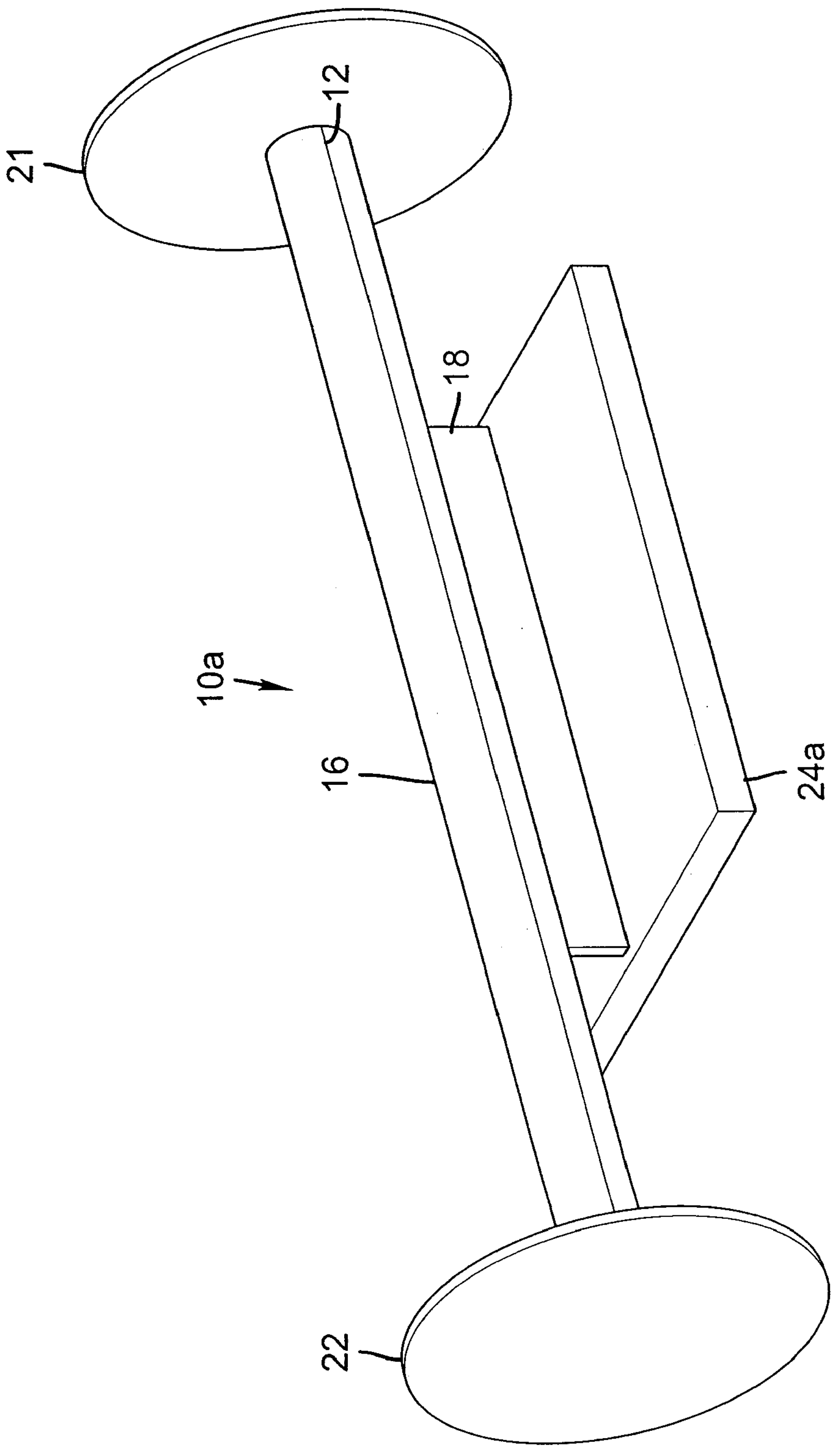
FIG. 2 depicts the end caps usable with the non-conductive dimensionally stable structure.

FIG. 2 shows the structure 10*a* with a first cap 21 disposed on the first end 12. A second cap 22 is disposed on the second end of the structure 10*a*. The caps 21 and 22 serve as protection so that the ends do not become coated during the electroforming process.

A conductive base 24*a*, as depicted in FIG. 2, is mounted to the second portion 18 of the structure 10*a*. Preferably, the conductive base 24*a* is a material with a low adhesion to the encapsulated structure or can be dissolved away. The conductive base 24*a* can be constructed of nickel, iron, aluminum, copper, alloys thereof and combinations thereof.

Figure 3:
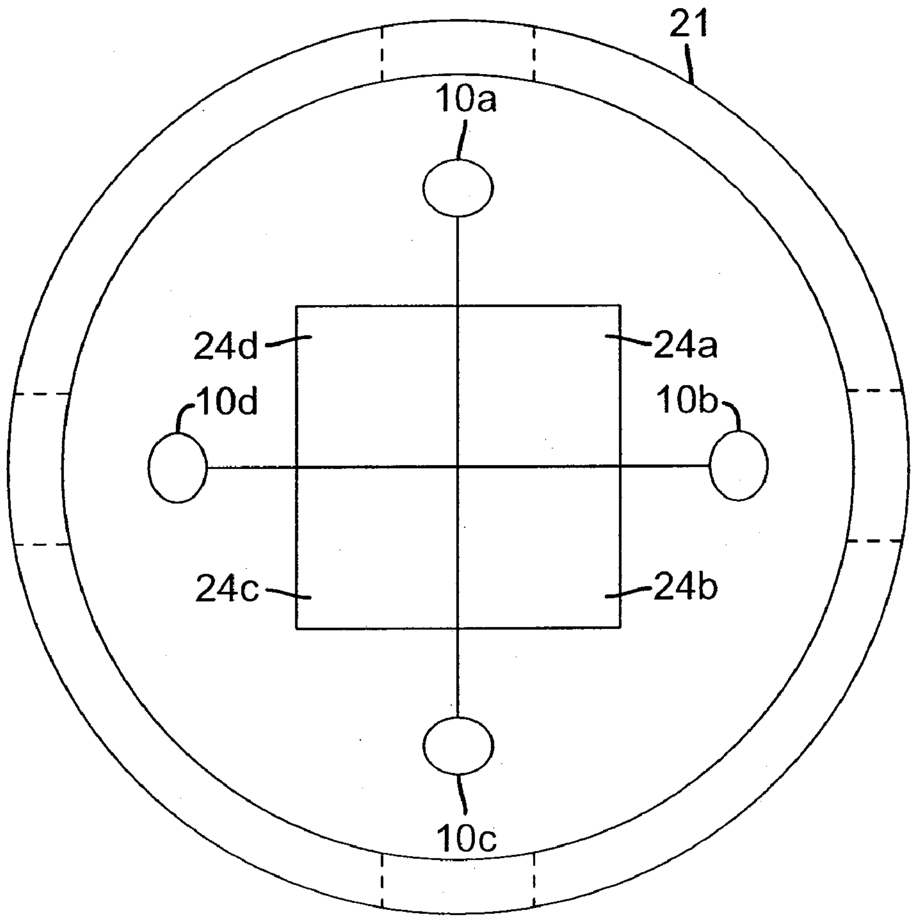
FIG. 3 depicts a detailed cross section of end caps with four non-conductive dimensionally stable structures.

FIG. 3 depicts an alternative embodiment, wherein four non-conductive dimensionally stable structures 10*a*, 10*b*, 10*c*, and 10*d* are contained within first cap 21. The structure can be a tube shown in FIG. 3. The cavity of the tube preferably has a dimension that is defined by the necessary dimensions for the channel of the drop generator. A conductive base 24*a*, 24*b*, 24*c*, and 24*d* can be mounted to each respective non-conductive dimensionally stable structure 10*a*, 10*b*, 10*c*, and 10*d*.

Figure 4:
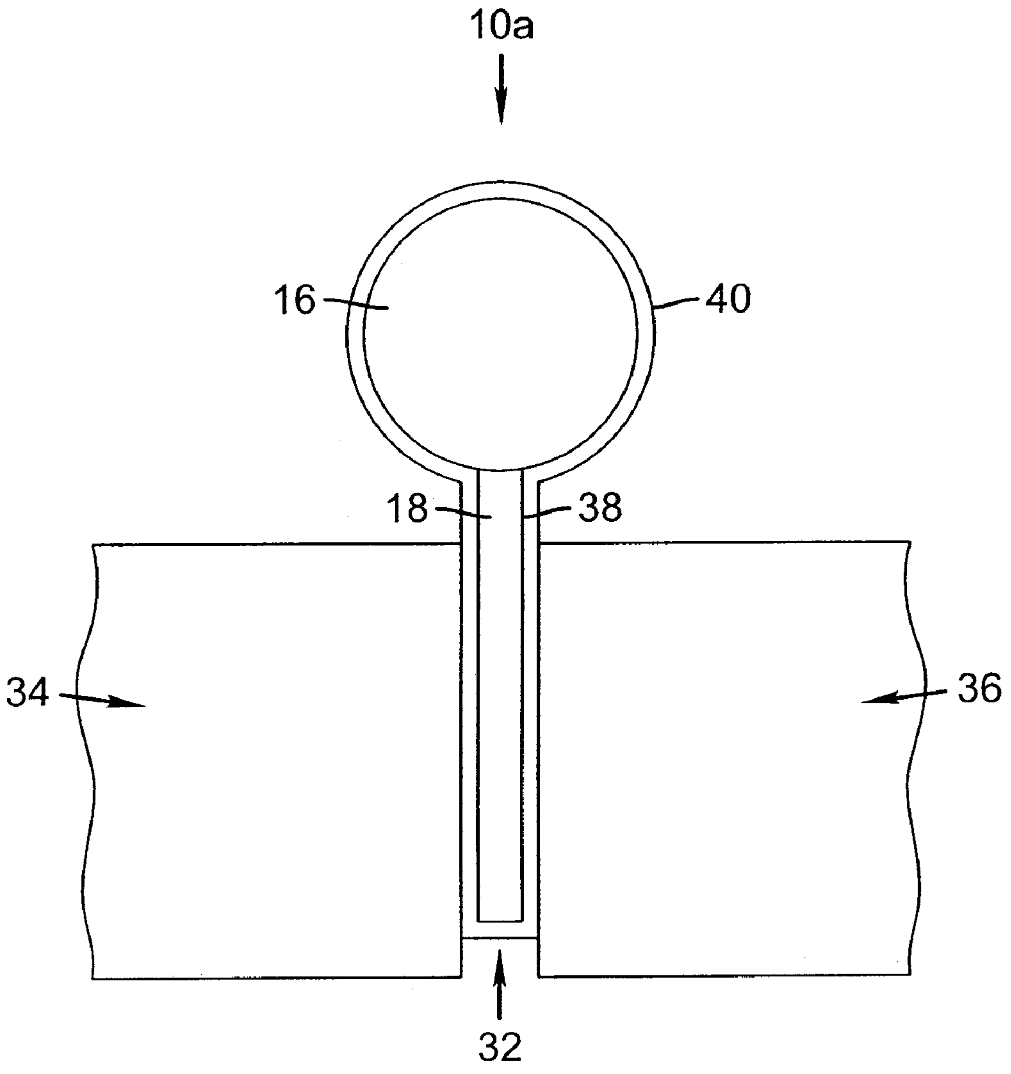
FIG. 4 depicts a cross section of a non-conductive dimensionally stable structure with a conductive base mounted thereto.

FIG. 4 examples an embodiment, wherein the conductive base has a first part 34 and a second part 36. The structure 10*a* has a first and second portion 16 and 18. The second portion 18 is disposed between first part 34 of the base and second part 36 of the base. The conductive base has a cavity 32 adapted to receive the second portion 18 of the non-conductive substrate structure 10*a* in place.

The embodiment in FIG. 4 depicts using a metal portion or a stiffener 38. The stiffener 38 is preferably a metal encapsulated by a non-conductive film 40. The non-conductive film preferably is a polyimide film. Other polymer films that are easily chemically dissolved can be used as well. The non-conductive film 40 surrounding the metal can be a composite, a crystalline polymer, a ceramic, a glass, and combinations thereof. Alternatively, a polyamide, such as Nylon™ from the E.I Dupont Co of Wilmington, Del., can be used. The film 40 preferably has a thickness so that only two layers of the film 40 are needed to form the desired shape.

The metal portion 38 is preferably an etchable, dimensionally stiff material, such as aluminum, steel, nickel, copper, and combinations thereof. The metal portion 38 can be a dissolvable or vaporizable material. The metal portion 38 can be a brass sheet. The metal portion 38 can be placed between the two layers of non conductive film 40. The metal portion 38 can be segmented.

Figure 5:
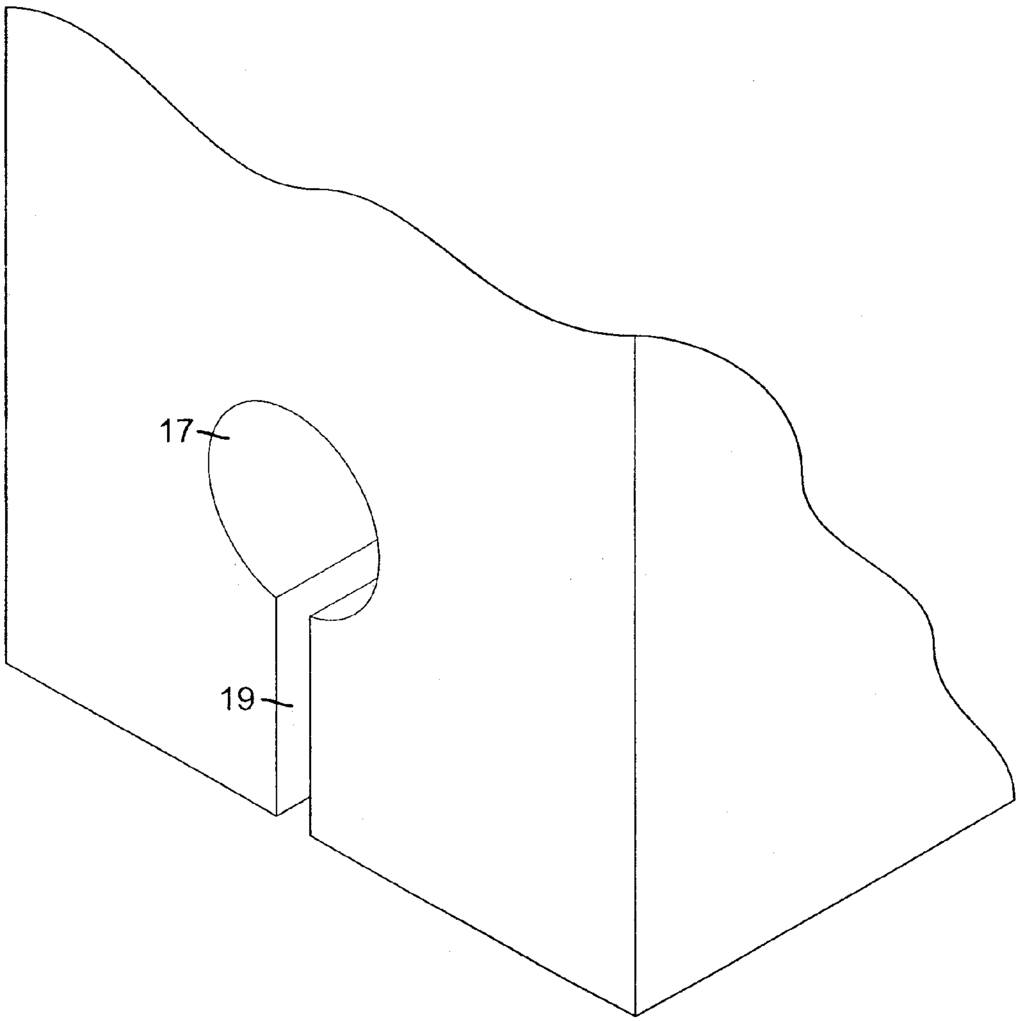
FIG. 5 shows a cross section view of a portion of the drop generator made by the embodied methods after the drop generator has been removed from the mandrel.

As discussed above, the non-conductive dimensionally stable structure 10*a* can be a metal tube wrapped with an adhesive-coated polyimide material, preferably Dupont Pyralux™ LF0220, to make the structure 10*a* non-conductive. The adhesive-coated polyimide material provides a smooth non-conductive surface for the inner bore of the drop generator. Pyralux™ is typically used in the fabrication of flexible electrical cables and has a B-stage acrylic adhesive on the inner side that does not become tacky until heated to 250 F. The Pyralux can be stretched around the structure or mandrel and clamped around the metal portion 38. The nonconductive dimensionally stable structure 10*a* is then formed by heating the wrapped substrate to about 200 F. and at least 250 psi pressure in a heated platen press to form a very rigid tube and fin structure upon cooling. FIG. 5 shows a cross section view of a portion of the drop generator made by the embodied methods after the drop generator has been removed from the mandrel. In FIG. 5, metal portion is encapsulated by the Pyralux™. The encapsulating material defines the ink channel 17 and the ink exit slot 19.

Figure 6:
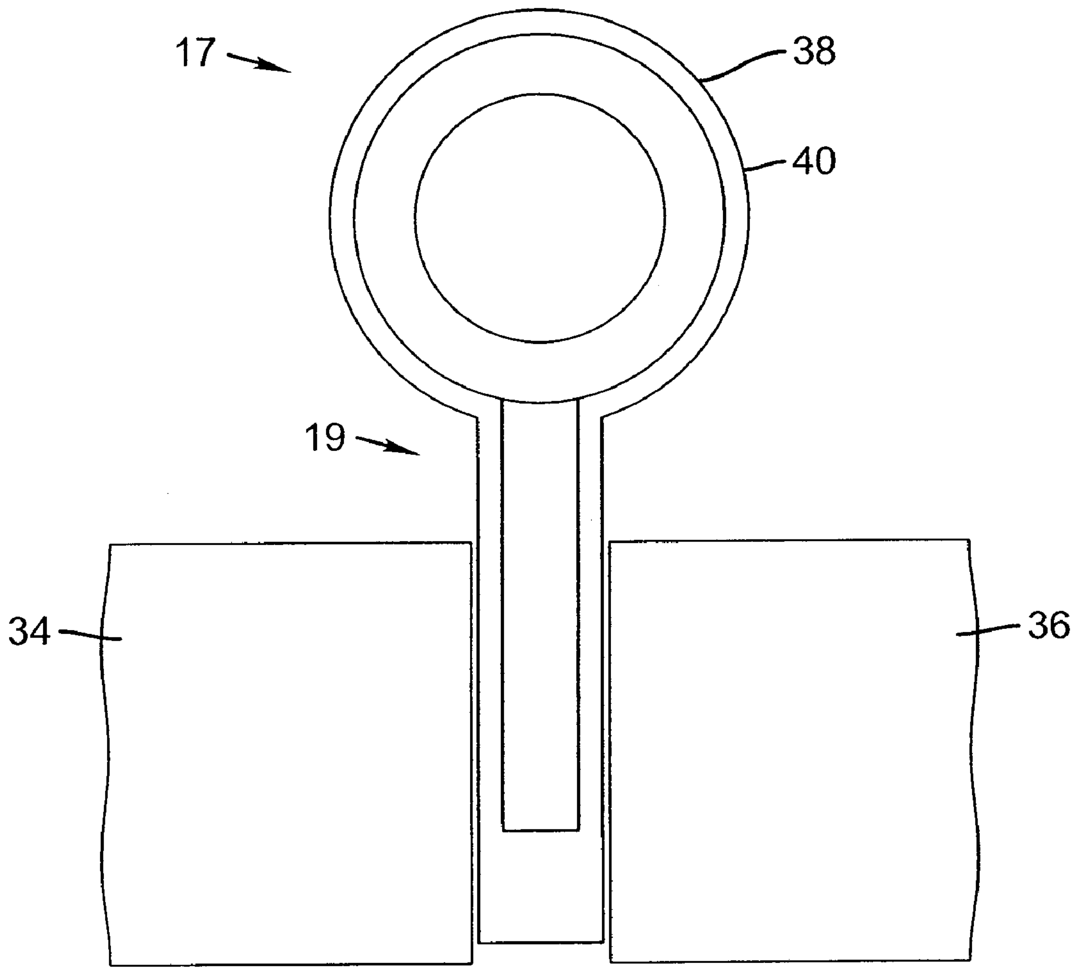
FIG. 6 depicts the first stage of the electroforming process.
Figure 7:
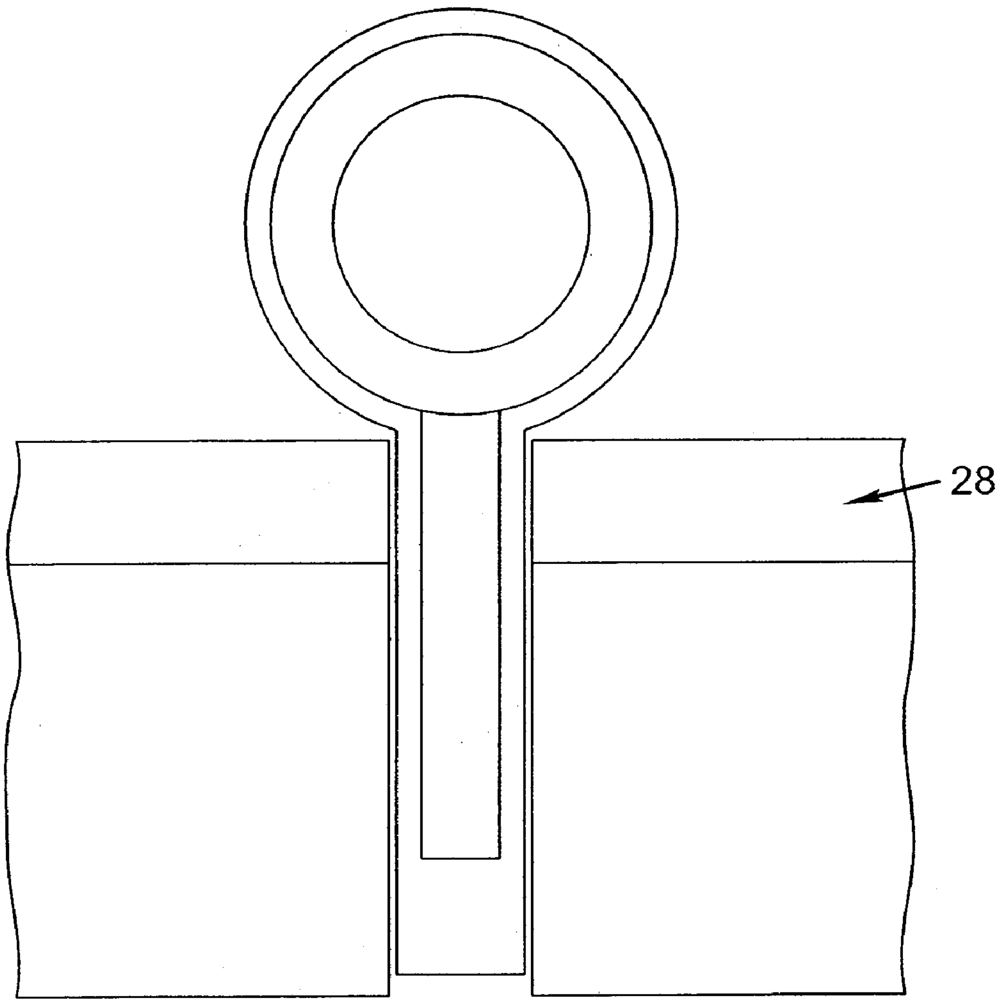
FIG. 7 depicts an intermediate stage of the electroforming process depicting an increasing thickness of the metal.
Figure 8:
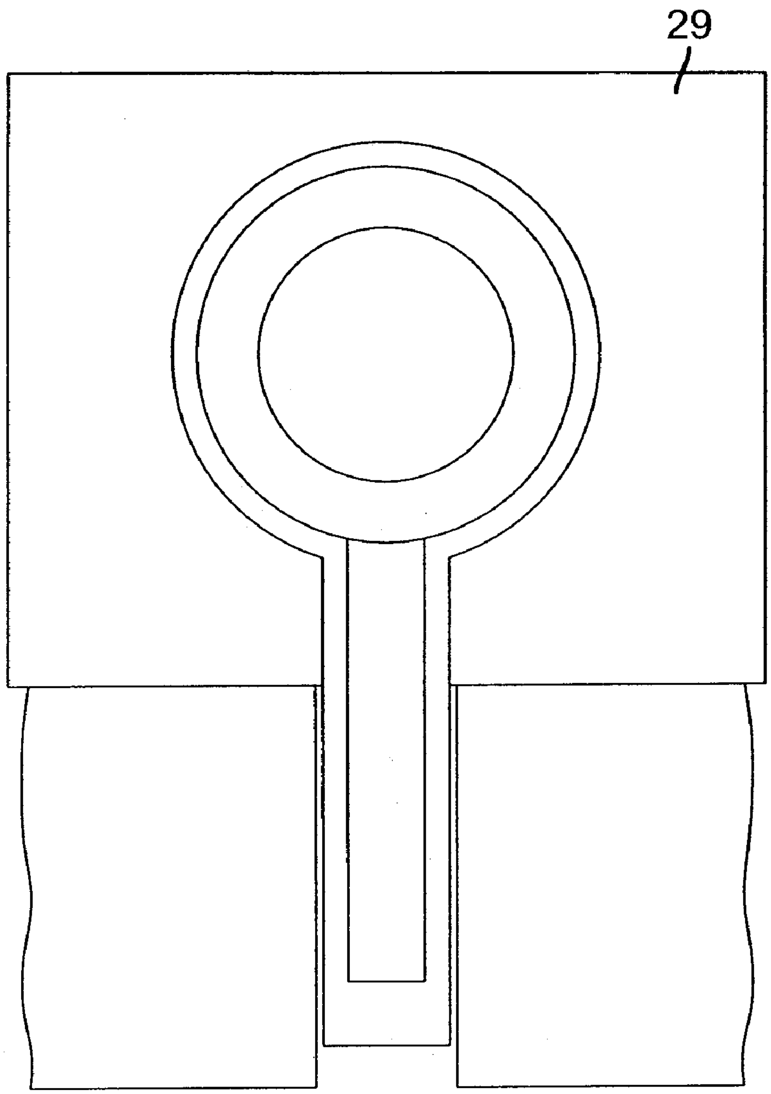
FIG. 8 depicts the final stage of the electroforming process as an encapsulated structure.

FIG. 6, FIG. 7, and FIG. 8 show a layer of nickel plating on a structure 10*a* formed during the electroforming step of the embodied methods. FIG. 6 shows the movement of electroforming material. After the electroforming is completed, the first and second caps 21 and 22 are removed and the structure 10*a* is removed through one of various processes, such as melting, vaporization, or other known techniques. FIG. 7 shows the built up preferred thickness 28 of the electroformed metal.

FIG. 8 shows a formed encapsulated structure 29 resulting from the electroforming. Polyimide can be removed in a strong caustic solution. If aluminum is used, the aluminum can be selectively etched in caustic. Copper alloys are quickly etched away in a solution of chlorites or persulfates in ammonia that does not etch the electroformed nickel.

Producing electroplating in great thicknesses requires that fresh electrolytes be provided uniformly to all areas of the part being plated. The method contemplates that at least four drop generators can be made simultaneously, but the method is not limited to four assemblies and can be constructed with one or more.

Figure 9:
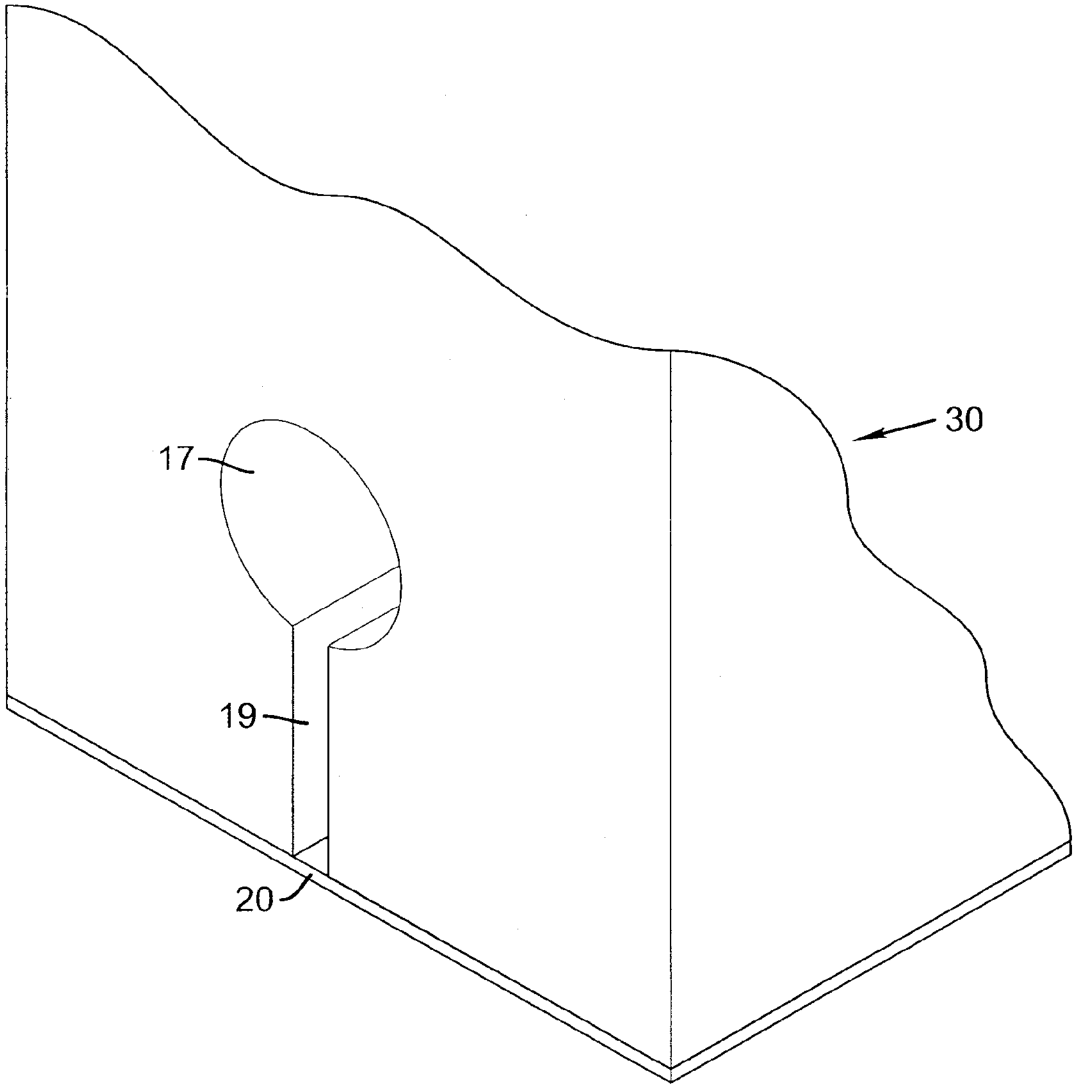
FIG. 9 depicts the final drop generator formed by the embodied process with the first and second caps removed.

FIG. 9 shows a cross section of the formed drop generator 30. The novel method produces a straight, smooth, clean channel 17 and slot 19. The drop generator 30 is bonded to the orifice plate 20 so that the slot 19 can communicate with an orifice plate 20.

The invention has been described in detail with particular reference to certain preferred embodiments thereof, but it will be understood that variations and modifications can be effected within the spirit and scope of the invention.

PARTS LIST

10*a*. non-conductive dimensionally stable structure
10*b*. non-conductive dimensionally stable structure
10*c*. non-conductive dimensionally stable structure
10*d*. non-conductive dimensionally stable structure
12. first end
14. second end
16. first portion
17. channel
18. second portion
19. slot
20. orifice plate
21. first cap
22. second cap
24*a*. conductive base
24*b*. conductive base
24*c*. conductive base
24*d*. conductive base
28. thickness of the electroformed metal
29. encapsulated structure
30. drop generator
32. cavity of the conductive base
34. first part of base
36. second part of base
38. metal portion (stiffener)
40. non-conductive film

The invention claimed is:

1. A method for fabricating a drop generator (30) comprising the steps of:

a. identifying a non-conductive dimensionally stable structure (10*a*) with a shape adapted to define a fluid cavity for the drop generator (30) for an ink jet printer, wherein the structure comprises a first end (12), a second end (14), a first portion (16) to be formed into a channel (17) for the drop generator (30), and a second portion (18) to be formed into a slot (19) for transferring fluid from the channel to an orifice plate (20);

b. covering the first end (12) with a first cap (21) and covering the second end (18) with a second cap (22);

c. mounting a conductive base (24*a*) to the non-conductive dimensionally stable structure (10*a*) to surround at least part of the second portion (18);

d. electroforming metal on the conductive base (24*a*) to encapsulate the non-conductive dimensionally stable structure (10*a*) between the first cap (21) and the second cap (22) to a thickness at least equivalent to a desired outer dimension, thereby forming an encapsulated structure (29);

e. removing the first cap (21) and the second cap (22) from the encapsulated structure (29); and f. removing the non-conductive dimensionally stable structure (10*a*) to form the drop generator (30) with the channel (17) adapted to receive fluid and the slot (19) adapted to communicate fluid from the channel (17) to the orifice plate (20).

2. The method of claim 1, further comprising the step of machining the encapsulated structure in order to form the exterior of the drop generator.

3. The method of claim 1, wherein the non-conductive dimensionally stable structure is selected from the group consisting of a composite, a crystalline polymer, a ceramic, a glass, and combinations thereof.

4. The method of claim 1, wherein the non-conductive dimensionally stable structure comprises a metal portion encapsulated by a non-conductive film.

5. The method of claim 4, wherein the non-conductive film is selected from the group consisting of a composite, a crystalline polymer, a ceramic, a glass, and combinations thereof.

6. The method of claim 4, wherein the metal portion is an etchable, dimensionally stiff material.

7. The method of claim 6, wherein the material is selected from the group consisting of aluminum, steel, nickel, copper, and combinations thereof.

8. The method of claim 1, wherein the conductive base further comprises a cavity for receiving at least a section of the second portion of the non conductive dimensionally stable structure.

9. The method of claim 1, wherein the conductive base is mounted so at least a section of the second portion is disposed between a first part of the base and a second part of the base.

10. The method of claim 1, wherein the conductive base is selected from the group consisting of nickel, iron, aluminum, copper, alloys thereof and combinations thereof.

11. The method of claim 1, wherein the conductive base is a material with a low adhesion to the encapsulated structure.

12. The method of claim 1, wherein the thickness of the metal from the conductive base to encapsulate the non-conductive dimensionally stable structure is a depth adapted to sustain machining of the encapsulated structure for forming the desired outer dimension for the drop generator.

13. The method of claim 1, wherein the first and second cap each comprise a nonconductive material adapted to shield the first and second ends from electroforming metal.

14. The method of claim 1, wherein the step of removing the non-conductive dimensionally stable structure is performed by etching, vaporizing, melting, dissolving, or combination thereof.

* * * * *